United States Patent Office 3,356,564
Patented Dec. 5, 1967

3,356,564
PREPARATION OF LATEX SATURATED ASBESTOS SHEET MATERIAL WHEREIN ANTI-PRECIPITATING AGENT PREVENTS PREMATURE COAGULATION
Richard C. Breiner, Florham, N.J., assignor to Nicolet Industries, Inc., Morris County, N.J., a corporation of Delaware
No Drawing. Filed Oct. 2, 1964, Ser. No. 401,259
19 Claims. (Cl. 162—155)

This invention relates to the preparation of saturated asbestos fiber sheet materials. More particularly, the invention relates to a process of preparing such products in which the solid content of a polymeric latex is deposited upon the fibers while in suspension, such as in a conventional papermaking beater, and thereafter forming the resulting slurry of coated fibers into a sheet material.

Rubber-bonded asbestos fiber sheet material has been prepared by a number of methods, including one known as the beater saturation process, which includes depositing the solids content of a latex upon the fibers while in a slurry, and thereafter forming a sheet from the coated fibers by means of conventional papermaking techniques. This process offers numerous advantages, as improved physical properties such as high tensile strength and the like may be obtained. However, there have been numerous difficulties involved in the production of an asbestos sheet by the beater saturation process. It is difficult to obtain uniform distribution of binder solids upon the asbestos fibers because of the clumping which promptly occurs when the latex is added to the slurry.

U.S. Patent 2,759,813 has postulated that the cause of this premature coagulation of binder is the presence in the water of polyvalent metal ions derived from the asbestos. This patent solves the problem: water soluble polycarboxylic acids which function as chelating or sequestering agents are introduced into the asbestos slurry prior to the addition of the aqueous dispersion latex of the binder material. Specific acids are citric acid and ethylene diamine tetraacetic acid.

U.S. Patents Nos. 3,056,714 and 3,056,715 overcome this difficulty by adding a nitroso dye or fluorescent dye to the aqueous slurry prior to the addition of the aqueous dispersion of binder material.

Lignin sulfonate has also been used as an anti-precipitating agent to prevent premature coagulation of the aqueous dispersion of binder material.

It can be seen that the anti-precipitating acids above are in general not cheap acids of commerce. Lignin sulfonate has an adverse effect on the drainage rate of the aqueous asbestos-binder slurry.

Saturated asbestos sheets and sheet articles as used in flooring materials have been deficient in stiffness and tensile strength. Where the binder material has included a polyvinyl chloride resin or phenolic resin, there is a tendency for the sheet to discolor when it is heated to the normal processing temperature of about 300°–425° F. There is a considerable need for saturated asbestos sheet material having a greater stiffness than is now available, and/or a greater tensile strength than is now available, while simultaneously the discoloration problem is reduced or even eliminated.

An object of the invention is a process for preparing saturated asbestos sheet material by the beater saturation process, wherein the asbestos fibers are evenly coated with a solid polymeric material, particularly an elastomeric material.

Another object of the invention is a stable aqueous dispersion of asbestos fibers and solid polymeric material of colloidal size.

Still another object of the invention is a process for coating asbestos fibers in an aqueous slurry using an aqueous dispersion of solid polymeric material, particularly elastomeric material, which process utilizes a cheap anti-precipitating agent.

Yet another object of the invention is a saturated asbestos sheet material prepared by removing the water from an aqueous coated asbestos fiber slurry wherein said fibers are evenly coated with solid polymeric material, particularly, elastomeric materials.

An additional object of the invention is a process for producing saturated asbestos sheet material of improved stiffness.

Another additional object of the invention is a saturated asbestos sheet material of improved tensile strength.

Yet another additional object of the invention is a saturated asbestos sheet material of improved color stability.

Still another additional object of the invention is a process for preparing saturated asbestos sheet material of improved stiffness and/or tensile strength and color stability.

Other objects of the invention will become apparent in the course of the detailed description thereof.

It has been discovered that premature coagulation of an aqueous dispersion of solid polymeric material intended for use as the binder in the preparation of saturated asbestos sheet material can be prevented by adding to the slurry of asbestos fibers in water, an ammonium phosphate, prior to the addition of the aqueous dispersion of solid polymeric material. The solid polymeric material is then coagulated to form particles which deposit evenly onto the asbestos fibers.

It has been discovered that a saturated asbestos sheet material of improved stiffness and/or tensile strength and color stability is produced when a water soluble acrylamide resin is introduced into an aqueous slurry of asbestos fibers, anti-precipitating agent, and dispersed polymeric material, prior to the addition of coagulating agent; and the water is removed. Preferably the acrylamide resin is a copolymer of acrylamide and acrylic acid.

The asbestos products which find most extensive commercial use are asbestos sheet materials that are usually produced by water laying and that are generally referred to as asbestos paper or asbestos "mill board," which is referred to herein generally as "paper." The bulk of the asbestiform mineral fiber that is used in asbestos paper usually runs from about $\frac{1}{10}''$ to $\frac{1}{4}''$ in length, although the fiber that is supplied for paper making generally contains a considerable quantity of shorter fibers of varying lengths and may contain a portion of longer fibers. The most generally accepted system of classification of asbestos fibers is that of the Quebec Asbestos Producers Association. The asbestos fibers which are most commonly used for the manufacture of asbestos paper are those which range from Group 5 or paper classification to the Group 7 or shorts classification of the Quebec Asbestos Producers Association, or mixtures thereof.

It is to be understood that the invention may be used with asbestos fibers of intermediate length and long spinning fibers; however, the invention is of particular utility in the manufacture of sheet materials and articles made from sheets, using the more common and less expensive fibers of the paper making grades mentioned above.

The binder utilized in the preparation of the saturated asbestos sheet material is derived from aqueous dispersions of solid polymeric materials. These dispersions preferably contain the solid polymeric material in the colloidal sizes such as exist in latex, e.g. natural rubber latex, synthetic rubber latex and polyvinyl chloride latex.

The binder dispersions contemplated by the present invention include synthetic rubber and natural rubber latexes. Typical of these synthetic rubbers are the products known as GR-S (SBR) which rubbers are copolymers of butadiene and styrene containing about 50% to about 70% by weight butadiene. There may also be used the Buna N's or Hycars (NBR) which are copolymers of butadiene and acrylonitrile containing about 50% to about 80% butadiene. The neoprenes may also be used. The neoprenes are polymers of 2-chloro-butadiene-1,3, which polymers are also known as polychloroprenes. If desired, homopolymers of butadiene may be employed as well as homopolymers and/or copolymers of butadiene homologues such as isoprene. These synthetic rubbers may be more specifically designated as elastomers derived from butadiene, isoprene, and chloroprene, and elastomeric copolymers of butadiene or isoprene with copolymerizable vinyl compounds such as styrene and acrylonitrile. The polymers and copolymers may contain a major amount of such copolymerizable ingredients as styrene.

The invention also contemplates use of binder dispersions wherein the particles are of a thermoplastic resin such as any of the polyvinyl resins, the polystyrenes, the polyacrylates and the polymethacrylates, the polyvinyl esters, for example, the copolymer of vinyl chloride and vinyl acetate, polyvinyl acetal, polyvinylalcohols, and copolymers of vinyl chloride with a wide variety of material such as styrene, acrylic acid esters, acrylonitrile, acrylamide, and the like.

Also included within the scope of the present invention are those binder dispersions of the thermoplastic phenol-aldehyde resins, including phenol-acetaldehyde and phenol-furfural resins and the corresponding resins obtained from cresols and other alkyl phenols. The binders may also be of the oil-modified phenolformaldehyde type.

The binder dispersions of the present invention also include the thermosetting resins such as the phenol-aldehyde resins, including particularly the phenol and alkyl-phenol-formaldehyde molding resins. The thermosetting resin dispersions also include alkyd resins, urea-aldehyde resins, non-cationic melamine-formaldehyde resins and the various alkyl or alcohol-reacted urea-formaldehyde resins and melamine-formaldehyde resins.

These dispersions may include bituminous particles such as asphalt, tars, and pitches, and bitumens; or they may constitute wax particles wherein the wax is paraffin, carnauba, montan, petrolatum, microcrystalline, or amorphous petroleum wax, or the chlorinated waxes.

Any of the forms of rosin may be used as a binder in the present invention.

The esters of rosin with polyhydric alcohols, the coumarone resins, the polyindene resins, and the coumarone-indene resins are also included as are the vinyl acetylene resins.

There may also be used binder dispersions of the polymerized, halogenated, unsaturated hydrocarbons such as, for example, polytetrafluorethylene, called "Teflon."

These dispersions (latexes) may contain additional compounding ingredients such as stabilizers, anti-oxidants and the like which are well-known to the art and which form no part of the present invention.

The amount of binder to be deposited onto the asbestos fibers is determined in accordance with the requirements of the final product. Generally speaking, the amount of binder deposited will be in the range of about 5–75% by weight of binder based on the dry weight of the asbestos fibers. Most frequently about 10–30% of elastomer based on the dry weight of the asbestos fibers yields good all-around sheet goods which lend themselves to gasketing application. In the preparation of saturated asbestos synthetic rubber sheet material, for flooring uses, it is preferred to add enough latex to provide about 10–20% of rubber binder, based on asbestos fiber present.

It is frequently advantageous to include one of the usual rubber antioxidants in the asbestos slurry in order to minimize oxidation of the coating during use.

The aqueous slurry of asbestos fibers includes an anti-precipitating agent to prevent premature coagulation of the dispersed solid polymeric material derived from the addition of an aqueous dispersion of solid polymeric material to the slurry. In the preparation of the anionic acrylamide resin containing saturated asbestos sheet, any anti-precipitating agent may be present, e.g., citric acid, ethylene diamine tetraacetic acid, or lignin sulfonate. In one embodiment of the invention the anti-precipitating agent is an ammonium phosphate which may be mono basic ammonium phosphate, dibasic ammonium phosphate, or tribasic ammonium phosphate. The mono basic ammonium phosphate is preferred.

With elastomeric latex the ammonium phosphate anti-precipitating agent is usually present in an amount of about 1–3% based on asbestos fiber present. (Unless otherwise stated all percentages herein are weight percent.)

An even deposit on the asbestos fiber of solid polymers as defined earlier, preferably elastomers, is obtained by the addition of a coagulating agent to the slurry of asbestos and dispersed binder. The coagulating agent may be any chemical which causes precipitation of the dispersed solid polymer. When using the anionic polyacrylamide resin, the retention of the resin by the asbestos is optimized by using an aluminum salt or ferric salt as the precipitating agent. Unlike the use of these anionic resins in paper making, pH of the slurry at the time of adding the precipitating agent is not critical; in general, a pH of 5–9 is suitable for the purpose of this invention.

Saturated asbestos sheet material of improved stiffness and/or tensile strength and color stability is obtained by the addition of water soluble anionic polyacrylamide resin, i.e., a polyacrylamide polymer containing carboxyl groups. These can be prepared by hydrolysis of some of the amide groups in polyacrylamide or by copolymerization of acrylamide with acrylic acid. A preferred anionic resin is an acrylamide-acrylic acid copolymer available from American Cyanamid Company as Accostrength Paper Resin, described in TAPPI, vol. 40, No. 10, October 1957, pp. 839–846 by W. F. Reynolds et al. The anionic resin is added to an aqueous slurry of asbestos fiber and dispersed polymeric binder material.

The amount of anionic acrylamide resin introduced will be dependent upon the characteristics desired in the final product, and also upon the type of anionic resin being used. In the case of an elastomeric binder material, it has been observed a superior product is obtained when using between about 0.5 and 5%, based on asbestos fiber. More usually, 0.5–2% is added.

The anionic acrylamide resin may be used in conjunction with any polymeric latex but is especially useful with elastomeric latex, particularly, SBR rubber and neoprene latexes.

It is to be understood that conventional pigments, extenders, and other materials normally added to saturated asbestos material may also be utilized in the process of this invention.

ILLUSTRATIONS

The processes of the invention are illustrated by the following working examples, which examples are not to be taken as limiting the scope of the invention. All percentages are by weight based upon the asbestos fiber charged. For clarity in the presentation each step in the process has been set out in a numbered paragraph; the approximate pH of the slurry is given for each step, in the form of a range.

The source of the commercial trade name items used in the examples is given below:

Acrylamide Resin (Accostrength 2386)—American Cyanamid Co.
Antioxidant 2246[(2,2'-methylene) bis(4-methyl-6-tert-butyl phenol)]—American Cyanamid Co.
Lignin Sulfonate (Marasperse N)—Marathon Corp.
Neoprene 735—Du Pont
SBR, carboxylated (9648)—Naugatuck Chemical Co.
SBR (58% styrene)—FRS 151—Firestone Rubber Co.

*Example 1*

(1) Asbestos fiber (Quebec grade 5) fibrillated in conventional papermaking equipment; pH 8.5–9.5.

(2) Addition of 1.5% zinc oxide and 0.4% non-discoloring anti-oxidant 2246; pH 8.5–9.5

(3) Dilution to 5.0 percent (5–10) consistency; agitation.

(4) Addition of 0.3% lignin sulfonate with agitation; pH 8.5–9.5.

(5) After mixing the above; 15% of Neoprene 735 was added and mixed for a few minutes. Acrylamide resin was then added from a three percent water solution with continued mixing; pH 8.5–9.5.

6) The above binder ingredients were subsequently precipitated upon the asbestos fiber by the addition of 2.5% aluminum sulfate (Paper Maker's Alum); pH 6–7.

(7) The above stock was processed through a four chest system to a lead chest (machine chest) where the temperature was increased to 120–150° F. and pH was 7–8. Paper was formed and dried on a conventional paper-machine.

The use of acrylamide resin results in unusually high stiffness; improved dry strength; hot strength; and color stability at elevated temperatures—relative to a neoprene sheet not containing this resin. Also, there was an improved retention of anti-oxidant and other fillers. However, a *slower drainage rate* was evident.

*Example 2*

(1) Asbestos fiber (Quebec grade 5) fibrillated in conventional papermaking equipment; pH 8.5–9.5.

(2) Addition of 1.5% zinc oxide and 0.4% non-discoloring anti-oxidant 2246; pH 8.5–9.5.

(3) Dilution to 5.0% consistency; agitation.

(4) Addition of 2.0% mono basic ammonium phosphate with agitation; pH 6.5–7.5.

(5) After mixing the above, 4% of a carboxylated SBR (55% Bound Styrene) emulsion was added and followed with eleven percent of a second SBR emulsion (58% Bound Styrene); pH 7–8.

(6) After allowing a few minutes mix time, the binder portion was completed with the addition of 0.75% acrylamide resin from a 3.0% water solution; pH at this point was 7–8.

(7) The above binder ingredients were subsequently precipitated upon the asbestos fiber by the addition of 2.5% aluminum sulfate (Paper Makers Alum); pH 5–7.

(8) The above stock was processed through a four chest system to a lead chest (or machine chest). Stock temperature at this point was raised to 120–150° F. and processed over the paper machine; (pH 6.5–7.5). Paper is formed by conventional forming and drying techniques.

The slurry after step 6 was uniformly dispersed and showed no sign of premature coagulation. Inspection of the slurry after the addition of the aluminum sulfate showed the elastomers and sizing agents were uniformly deposited on the asbestos fibers. There was improved drainage throughout the entire stock system relative to conventional SBR systems-drainage rates and hold up time have been shown to be superior to conventional chelating/dispersing agents such as lignin sulfonates and citrates.

The finished sheet showed a slight, significant, improvement in color stability. The strength of the sheet was about 40% greater than a sheet made without the acrylamide resin.

Thus having described the invention, what is claimed is:

1. In the process of preparing an asbestos sheet article wherein:
   (a) there is formed a slurry of asbestos fibers in water;
   (b) which slurry includes an anti-precipitating agent to prevent coagulation of dispersed solid polymeric material;
   (c) an aqueous dispersion of solid polymeric material is added to said slurry;
   (d) then an agent is added to cause coagulation of said dispersion so as to deposit said polymeric solids evenly onto said asbestos fibers;
   (e) and said slurry of coated fibers is formed into a sheet article, the improvement wherein said anti-precipitating agent is an ammonium phosphate.

2. A process in accordance with claim 1 wherein said anti-precipitating agent is mono basic ammonium phosphate.

3. A process in accordance with claim 1 wherein said dispersion consists essentially of an elastomeric material.

4. A process in accordance with claim 3 wherein said elastomer is an SBR rubber.

5. A process in accordance with claim 1 wherein said precipitating agent is aluminum sulfate.

6. A process for producing saturated asbestos-elastomeric sheet material which process comprises:
   (a) forming a slurry of asbestos fibers and ammonium phosphate in water, said phosphate being present in an amount of about 1–3% based on said asbestos;
   (b) adding an elastomeric latex in an amount of about 10–30%, based on said asbestos, to said slurry while agitating said slurry;
   (c) adding a coagulating agent to said asbestos-latex slurry while agitating said slurry, to obtain an even deposit of elastomer on said asbestos fiber; and
   (d) forming the resulting slurry of elastomer coated fiber into a sheet material by removing the water therefrom.

7. A process in accordance with claim 6 wherein said phosphate is mono basic ammonium phosphate.

8. A process in accordance with claim 6 wherein said elastomer is SBR rubber.

9. A process in accordance with claim 6 wherein said elastomer is neoprene rubber.

10. A process in accordance with claim 6 wherein said elastomer is acrylonitrile rubber.

11. A process in accordance with claim 6 wherein said coagulating agent is aluminum sulfate, which sulfate is added in an amount of about 2–5% based on said asbestos fiber.

12. A process in accordance with claim 6 wherein an anionic polyacrylamide resin is added to said slurry of asbestos fiber and elastomeric latex.

13. A process in accordance with claim 12 wherein said resin is a copolymer of acrylamide and acrylic acid.

14. A process in accordance with claim 12 wherein said resin is added in an amount of about 0.5 to 2% based on said asbestos fiber.

15. In the process of preparing an asbestos sheet article wherein:
   (a) there is formed a slurry of asbestos fibers in water;
   (b) including an anti-precipitating agent to prevent coagulation of dispersed solid polymeric material;
   (c) an aqueous dispersion of solid polymeric material is added to said slurry;
   (d) then an agent is added to cause coagulation of said dispersion so as to deposit said polymeric solids onto said asbestos fibers;
   (e) and said slurry of coated fibers is formed into a sheet article, the improvement which comprises:
   (f) adding to said slurry, prior to the addition of said precipitating agent, an anionic acrylamide resin.

16. A process in accordance with claim 15 wherein said resin is a copolymer of acrylamide and acrylic acid.

17. A process in accordance with claim 15 wherein said anti-precipitating agent is an ammonium phosphate.

18. A process in accordance with claim 17 wherein said phosphate is mono basic ammonium phosphate.

19. A sheet article made by the process of claim 15.

References Cited

UNITED STATES PATENTS

| | | | |
|---|---|---|---|
| 2,567,559 | 9/1951 | Greider et al. | 162—152 X |
| 2,690,100 | 9/1954 | McGarvey | 162—152 |
| 2,868,641 | 1/1959 | Feigley | 162—155 |
| 2,940,892 | 6/1960 | Feigley et al. | 162—155 X |
| 3,056,717 | 10/1962 | Feigley et al. | 162—155 |

DONALL H. SYLVESTER, *Primary Examiner.*

H. R. CAINE, *Assistant Examiner.*